United States Patent [19]
Casey

[11] 3,769,856
[45] Nov. 6, 1973

[54] TIRE BUILDING APPARATUS
[75] Inventor: William R. Casey, Akron, Ohio
[73] Assignee: The Goodyear Tire & Rubber Company, Akron, Ohio
[22] Filed: June 28, 1972
[21] Appl. No.: 266,898

[52] U.S. Cl. ................... 74/675, 156/414, 192/4 R
[51] Int. Cl... F16h 37/08, B29h 17/16, F16d 67/02
[58] Field of Search ...................... 74/665 K, 665 L, 74/665 M, 665 N, 675; 192/4 R, 48.8, 48.91; 156/414, 415, 417, 418, 420

[56] References Cited
UNITED STATES PATENTS

| | | | |
|---|---|---|---|
| 2,491,260 | 12/1949 | Green | 74/675 X |
| 1,606,695 | 11/1926 | Cole | 156/419 X |
| 2,067,685 | 1/1937 | Schaper | 192/48.8 |
| 2,745,297 | 5/1956 | Andrus | 74/675 UX |
| 3,493,454 | 2/1970 | Cooper et al. | 156/415 |
| 3,576,693 | 4/1971 | Pacciarini et al. | 156/417 |
| 3,625,072 | 12/1971 | Bobard | 192/48.91 |

Primary Examiner—Allan D. Herrmann
Attorney—F. W. Brunner et al.

[57] ABSTRACT

Apparatus for supporting and actuating a tire building drum which comprises a spindle assembly having in the disclosure three telescopically arranged members coaxial with a common longitudinal axis each of which is connectable to actuate particular parts or elements within the drum. Drive trains, designated primary and secondary, each include selectively operable clutches enabling rotation of the spindle assembly both as a synchronously corotatable unit and alternatively for rotating a selected member relative to the other or others. Geared differential units having two inputs connected respectively to different members of the spindle assembly produce rotational outputs proportional to the relative angular displacement between such connected members. The differential outputs can drive a series of cam lugs past a fixed battery of limit switches or a pointer along a scale to measure and to signal to the relative angular displacement of one member relative to the other as well as to control such relative movement. The parts and elements within the drum required to be moved by the members of the spindle assembly are monitored and controlled.

28 Claims, 3 Drawing Figures

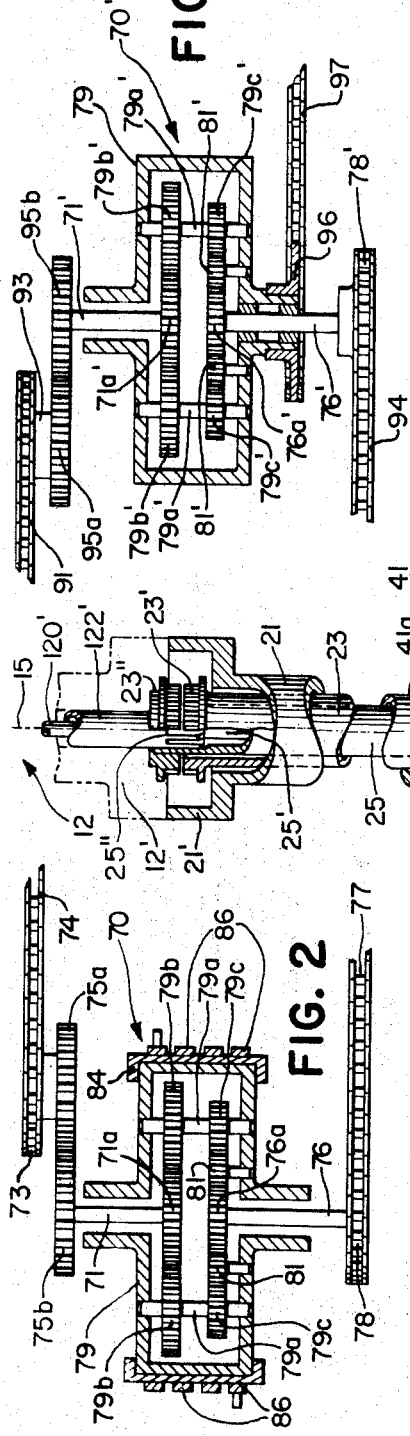
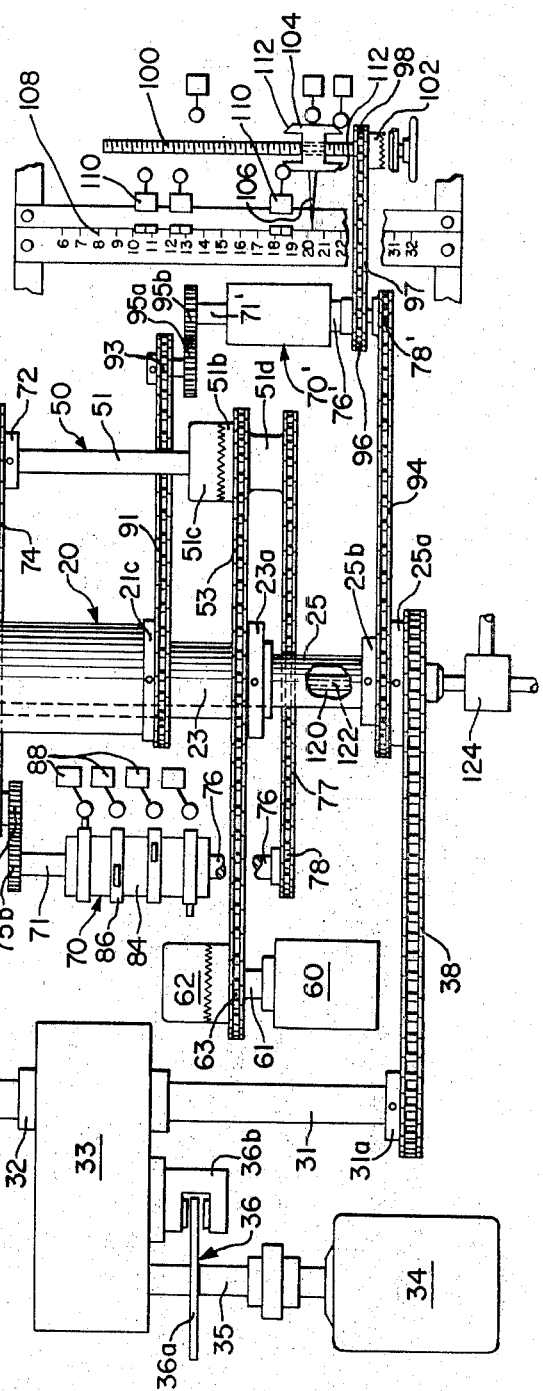

TIRE BUILDING APPARATUS

The foregoing abstract is not to be taken as limiting the invention of this application, and in order to understand the full nature and extent of the technical disclosure of this application, reference must be made to the accompanying drawing and the following detailed description.

This invention relates to tire building apparatus and particularly to a drive apparatus for a tire building drum.

In the following description of a preferred and exemplary embodiment of the invention, reference will be made to the attached drawing in which:

FIG. 1 is a schematic plan view of a drive apparatus in accordance with the invention; and FIGS. 2 and 3 are schematic sectional views of portions of the apparatus of FIG. 1.

FIG. 1 depicts schematically an apparatus 10 in accordance with the invention for supporting and actuating a tire building drum 12 a portion 12' of which is seen in FIG. 1. The drum is supported for rotation about its own longitudinal axis 15. The spindle assembly 20 of the apparatus 10 includes a plurality of coaxial members arranged telescopically about a common longitudinal axis aligned coaxially with the drum. The outer member of the assembly is a tubular spindle 21 of circular cross-section which is provided with a flange 21' or equivalent means to which the drum is removably secured. The spindle 21 is carried in suitable bearings (not shown) fixed in the frame housing of apparatus 10. The frame supports the apparatus 10 in any convenient conventional manner and is, therefore, not further described nor shown in the drawing.

A tire building drum particularly adapted for use in connection with the apparatus 10 is described in the present applicant's application Ser. No. 266,885, filed of even date herewith, to which application reference may be made, the said application being incorporated herein by reference.

The second member is a tubular structure 23, also of circular cross-section, termed herein a quill, which is mounted in the spindle 21 by suitable bearings which permit relative coaxial rotation between the spindle 21 and the quill 23. Formed integrally at the drum end of the quill 23 is a gear 23' suitably adapted to serve as drive coupling means to engage and to drive a mechanism 23" for raising and lowering the segments radially of the drum 12. It will be appreciated that this gear 23' or its equivalent can as well operate to actuate any independently operable portions of a drum which may be attached to the apparatus 10. The quill 23 extends coaxially through the spindle 21 and outwardly thereof at least sufficiently to accommodate a drive sprocket 23a fixed coaxially and corotatably on the quill.

A third member of the assembly is provided by an inner shaft 25 mounted within the quill 23 on suitable bearings which enable relative rotation between the inner shaft 25 and the quill. At the drum end of the inner shaft 25 is provided a spline 25' which serves as drive coupling means to engage a corresponding center shaft 25" in the drum 12 and to drive, for example, a screw mechanism (not shown) for moving, in a known manner, parts of the drum axially toward and away from each other. Again, it will be appreciated that the inner shaft 25 can be connected to any such independently operable mechanism within the drum.

The inner shaft 25 extends through the quill 23 and axially outwardly thereof away from the drum to accommodate coaxially and corotatably thereon two sprockets 25a, 25b. The sprocket 25a forms a part of the drive train designated, for convenience in description, as a primary drive train 30.

The primary drive train 30 includes a primary shaft 31 which extends, parallel to and spaced from the axis 15, coaxially through and is supported corotatably in the hollow output shaft 32 of the reduction gear unit 33 fixed in the frame. The gear unit 33 is driven by an electric motor 34 or its equivalent which is coupled to the input shaft 35 of the gear unit. The input shaft 35 carries the brake disc 36a of the brake 36 which cooperates with the shoes held in a brake caliper 36b affixed to the reduction gear unit.

A sprocket 31a fixed corotatably on the primary shaft 31 is connected by a driving chain 38 to the sprocket 25a mounted on the inner shaft 25. A sprocket 31b mounted rotatably on the primary shaft 31 in coplanar alignment with a sprocket 21a mounted coaxially and corotatably on the spindle 21. The sprockets 21a, 31b are drivably connected by a drive chain 39. A remotely actuable positive jaw clutch 31c is carried by the primary shaft 31 to permit relative rotation between the sprocket 31b and the shaft 31 and alternatively to engage the sprocket 31b with the primary shaft 31 for positive corotation. The primary drive means just described connects the spindle 21 and the inner shaft 25 for positive synchronous corotation while the clutch 31c is positively engaged. By opening or disengaging the clutch, the primary drive means operates to rotate only the inner shaft 25 relatively with respect to the spindle 21.

During such relative rotation between the inner shaft 25 and the spindle 21, the spindle is controlled and held against rotation by brake 41 comprising a brake disc 41a mounted corotatably on the spindle 21 and a brake caliper 41b fixed on the frame.

The previously referred to drive means includes also a secondary drive train 50 comprising a secondary shaft 51 mounted for rotation about its own longitudinal axis which is parallel to and spaced radially away from the axis 15 of the spindle. A sprocket 51a is coaxially and corotatably fixed on the shaft 51 in coplanar alignment with and drivingly connected to a sprocket 21b mounted coaxially and corotatably on the spindle 21 by the drive chain 52. A sprocket 51b is mounted coaxially and rotatably on the secondary shaft 51 in coplanar alignment with the sprocket 23a on the quill 23. A remotely actuable clutch 51c is operable to engage the sprocket 51b with the secondary shaft 51 for corotation therewith and to disengage the sprocket 51b to permit its rotation relatively of the shaft 51. The sprocket 51b is connected to the sprocket 23a by a drive chain 53. While the clutch 51c is positively engaged, the spindle 21 and the quill 23 are positively and synchronously corotatable; opening or disengaging the clutch 51c permits relative rotation between the quill 23 and the spindle 21.

To rotate the quill 23 relatively with respect to the spindle 21 and/or with respect to the inner shaft 25, a second drive means in the form of a hydraulic motor 60, or its equivalent, is provided on its output shaft 61 with a remotely actuable clutch 62 having a sprocket 63 mounted thereon in coplanar alignment with the chain 53. The chain 53 drivingly engages each of the sprockets 23a, 51b, and 63. With the clutch 62 open or disengaged, the sprocket 63 free-wheels while the quill 23 is being rotated by the secondary shaft 51. While the clutch 51c is disengaged and the clutch 62 engaged the sprocket 51b free-wheels about the shaft 51 while the quill 23 is driven in rotation relative to the spindle 21 and/or to the inner shaft 25 by the motor 60.

In order to control within appropriate limits the relative movement of the actuating mechanisms within the drum, it is desired to control correspondingly the relative rotation or relative angular displacement of one member of the assembly 20 relative to the other or others. To this end, the apparatus 10 includes a geared differential unit 70, a schematic section view of which is seen in FIG. 2. The differential unit 70 has first input means comprising a shaft 71 which is connected in positive driving relation to the spindle 21 by way of the secondary shaft 51 for convenience in mechanical arrangement. The secondary shaft 51 is positively connected in fixed driving ratio with the spindle 21 by the chain 52. A sprocket 72 on the secondary shaft 51 is connected with a sprocket 73 by a chain 74. One 75a of a pair of reversing gears 75a, 75b is mounted in a frame coaxially and corotatably with the sprocket 73 and is in mesh with the other reversing gear 75b which is corotatably and coaxially mounted on the input shaft 71 of the differential unit 70. The second differential input means comprises an input shaft 76 which is connected in positive driving relation with the quill 23 by way of the drive chain 77 which drivingly connects the sprocket 78 with the sprocket 51d mounted on the shaft 51 coaxially and corotatably with the sprocket 51b which, as has been mentioned, is positively connected in fixed driving ratio with the sprocket 23a on the quill 23 by the chain 53.

The differential unit 70 itself is represented schematically in FIG. 2. The first input shaft 71 extends coaxially of the differential unit and corotatably carries an input gear 71a. The second input shaft 76 extending coaxially of the differential unit carries for corotation the sprocket 78 and the input gear 76a. The differential output means comprises the generally cylindrical shell 79 which is mounted on suitable bearings (not shown) for rotation about its own axis coaxially of the differential unit 70. A planet shaft 79a is rotatably fixed in the shell parallel to and spaced radially from the axis of the differential unit. The shaft 79a carries two gears 79b, 79c mounted coaxially and corotatably thereon and spaced axially thereof. The gear 79b is in driving mesh with the first input gear 71a; the gear 79c is in driving mesh with an idler pinion 81 which is fixed rotatably in the shell 79, the pinion 81 being, in turn, in driving mesh with the second input gear 76a.

Differential gear units are well understood in the related arts. FIGS. 2 and 3 illustrate spur gear differentials but it will be appreciated that any differential gear arrangement, for example, a bevel gear differential, can be used with about equal facility. It will also be understood that the schematic showings in FIGS. 2 and 3 are not to scale and that the gears and pinions within the unit are spaced angularly about the rotation axis of the differential unit.

According to well understood principles of differential gear units, the ratios of the gears 71a, 79b and of the gears 76a, 81, 79c are selected such that angular displacements or rotations equal in direction and magnitude of the first and second input shafts 71 and 76 result in zero angular displacement of the differential shell 79 and that any difference in direction or in magnitude of angular displacement between the first input means and the second input means results in a rotation or angular displacement output by the differential shell 79. Because the unit is a geared differential, the angular displacement of the differential shell 79 will be directly proportional to the algebraic difference of the angular displacements of the shaft 71 and the shaft 76. Thus, the angular displacement of the differential shell 79 will be a direct measure of the relative angular displacement between the spindle 21 and the quill 23.

Further, in accordance with the invention, in order to utilize the displacement of the differential shell, a cylindrical sleeve 84 is mounted concentrically on the differential shell 79 and is provided with conventional clamping devices by which the sleeve can be displaced angularly about the shell. The sleeve 84 carries thereon a plurality of cam lugs 86, the relative positions of which are selectable to represent the relative positions and particularly of the end limits of displacement of the operating mechanism within the drum 12 to be operated by the relative rotation of the quill 23. To serve as displacement sensors which respond to the various angular displacements of the differential shell 79, a plurality of limit switches 88 are fixed to the frame in such manner as to be engageable by the cam lugs 86 at particular angular displacements thereof about the differential unit axis.

In the apparatus 10 a second differential unit 70' [identical parts thereof being designated by like numerals distinguished by a prime (')] like that just described has its first input shaft 71' connected in positive driving relation with the spindle 21 by a chain 91 drivingly engaged with a sprocket 21c corotatably and coaxially fixed on the spindle 21 and a sprocket 23 coaxially and corotatably mounted together with a first reversing gear 95a which meshes with the second reversing gear 95b mounted coaxially on the first input shaft 71' of the differential unit 70'. The second differential input shaft 76' is connected in positive driving relation with the shaft 25 by a sprocket 78', mounted coaxially and corotatably of the input shaft 76', and the sprocket 25b, the sprockets 78' and 25b being connected by a driving chain 94. The respective inputs of the differential unit 70' are thus connected positively to the spindle 21 and to the inner shaft 25. As in the previously described differential unit 70, the differential output means includes the differential shell 79'. A sprocket 96 mounted coaxially of and corotatably with the differential shell 79' is connected by a drive chain 97 to a sprocket 98 mounted coaxially and rotatably on a lead screw 100. The sprocket 98 is connected for or released from corotation with the lead screw 100 by a manual clutch 102. The manual clutch can be disengaged to permit rotation of the lead screw 100 independently and relatively of the drive 96, 97, 98 and, therefore, of the differential shell 79' for purposes of coordinating the relative rotation of the shaft 25 in proper phase with the connecting center screw of the drum 12.

A non-rotating nut 104 is engaged with the lead screw 100 for movement longitudinally therealong in response to rotation of the screw. It will be understood that the nut is restrained from rotation by conventional means, not shown. An indicator 106 or pointer fixed on the nut cooperates with a linear scale 108 which is disposed parallel to the lead screw and cooperates with the indicator 106 to display an analog of the relative axial positions of the axially movable elements within the drum which are actuated by the inner shaft 25. In order to employ the analog provided of the angular displacement of the inner shaft 25 relative to the spindle 21 and thus of the axial positions of movable elements moved thereby within the drum 12, a plurality of displacement sensors such as the limit switches 110 are fixed at selected intervals along the linear scale 108 such that the switches 110 are actuated by cams 112 formed on the nut 104 at preselected intervals of displacement of the nut along the lead screw which displacements are analogous to the displacements of the axially movable elements within the drum. The electrical or like signals provided by individual limit switches can, as will be understood, be employed to actuate the clutches, the brakes, and the drives, as well as for other purposes.

In order to operate further movable elements within the drum 12, air passage means through the spindle 20 are provided in the apparatus. The inner shaft 25 is of tubular form which accommodates an air tube 120 extending longitudinally therethrough, and between the air tube and the inner wall surface of the inner shaft 25 an annular air passage 122 which tube and passage are connected respectively by means of a conventional rotary joint 124 to means for the supply to and release from the drum 12 of compressed air. This feature makes it unnecessary to connect to the drum and disconnect therefrom temporary air hoses for the operation of such movements as inflating an elastomeric sleeve on the drum. The air tube 120 and annular air passage 122 are releasably connected to a corresponding annular passage 122' and a tube 120' fixed within the drum.

The modes of operation of the apparatus will have become generally apparent from the foregoing description of the structure. The operation of the tire building drum 12 includes rotation of the drum while axially and radially movable elements therein remain relatively fixed in position within the drum. For this mode of drum operation, the spindle assembly 20 including each of its members, namely, the spindle 21, the quill 23, and the inner shaft 25, are driven in synchronous corotation without relative angular displacement between the spindle and the quill or between the spindle and the inner shaft. This mode is accomplished by cooperation of the primary 30 and secondary 50 drive trains, the clutches 31c and 51c thereof being in full positive engagement. The brakes 36 and 41 are both in released mode and the spindle assembly 20 is driven by the motor 34 through the reduction gear 33, the primary shaft 31, and the drive chains 38 and 39. The secondary shaft 51 is driven in fixed ratio relation with the spindle 21, and with the clutch 51c positively engaged, the quill 23 is therefore likewise positively connected for synchronous corotation with the assembly 20.

In order to operate one of the plural mechanisms within the drum 12, and in particular by way of example, a plurality of segments which are raised and lowered with respect to the drum axis to expand or to collapse such drum, the quill 23 is rotated relatively with respect to the spindle 21 while the latter is maintained nonrotating by application of the brake 41. In order to rotate the quill 23 relatively with respect to the spindle 21 and the inner shaft 25, the clutches 31c and 62 are engaged while the clutch 51c is opened or disengaged, the motor 34 is de-energized and positively stalled by application of the motor brake 36 in which mode the inner shaft 25 is also prevented from rotating, while the hydraulic motor 60 is energized to drive the chain 53 and the quill 23.

The relative rotation between the quill 23 and the spindle 21 produces a relative angular displacement of the differential shell 79 about its axis such as to actuate at least one of the limit switches 88. Upon actuation of the limit switch, the relative angular movement of the quill 23 is stopped by disengaging the clutch 62 and engaging the clutch 51c.

To provide relative rotation of the inner shaft 25 with respect to the spindle 21, the clutch 62 and clutch 31c are both disengaged and the spindle brake 41 is applied. The motor brake 36 is released and the motor 34 energized to produce power flow from the motor through the reduction gear and primary shaft to the chain 38 by which the inner shaft 25 is rotated, the spindle 21 being held nonrotatable by the brake 41. In this mode, the input to the differential 70' from the spindle 21 by way of the chain 91 is zero while the second input 76' to the differential by way of the chain 94 is rotated in a direction corresponding to the relative rotation of the shaft 25 and of the screw within the drum which operates to move the end parts of that drum toward or away from each other. In the differential shell 79' there results a rotational displacement which is an analog of the displacement of the end parts axially of the drum. This angular displacement of the differential shell 79' is communicated to the lead screw 100 by way of the chain 97 so as to move the nut 104 linearly along the scale 108 and to engage the nut successively with one or more of the limit switches 110. The actuation of a particular limit switch produces an electrical signal useful to deenergize the motor 34 and actuate the brake 36 thus stopping relative rotation between the inner shaft 25 and the spindle 21 and locating the axially movable elements of the drum in their preselected dispositions.

The electrical, hydraulic, and air circuits employed in the apparatus are entirely conventional and not within the scope of the present invention, hence require no description.

While certain representative embodiments and details have been shown for the purpose of illustrating the invention, it will be apparent to those skilled in the art that various changes and modifications may be made therein without departing from the spirit or scope of the invention.

What is claimed is:

1. A tire building drum drive apparatus comprising a rotatable spindle assembly for supporting and actuating said drum, the assembly including at least three members of circular cross-section disposed telescopically about a common longitudinal axis, each member being rotatable both with and relatively of the other members and each having at its drumward end means individually drivingly connectable to independently operable parts of said drum, and drive train means operable to rotate at least one pair of said members in synchronous corotation and to rotate at least one of said members relatively with respect to the other said members.

2. Apparatus as claimed in claim 1, including brake means operable to control rotation of at least one of said members during rotation of an other of said members relatively of said one thereof.

3. Apparatus as claimed in claim 2, said brake means comprises a brake disc mounted on said spindle assembly for corotation therewith and a cooperating brake shoe mounted on a stationary frame.

4. Apparatus as claimed in claim 1, including differential means having first input means connected in positive driving relation with one of said members, second input means connected in positive driving relation with an other of said members and differential output means rotatable proportionally to the difference in angular displacement about said axis between said one and said other of the respectively associated members.

5. Apparatus as claimed in claim 4, further including means comprising a plurality of cam lugs adjustably fixed on said differential output means, a displacement sensor disposed for engagement with each of said cam lug at a preselected degree of angular displacement of said differential shell about its own rotation axis.

6. Apparatus as claimed in claim 4, said differential means being a rotatable geared differential and said output means being connected by at least one pair of meshing gears to each of said input means.

7. Apparatus as claimed in claim 1, said drive train means including a shaft mounted for rotation parallel to said longitudinal axis, a first driving chain drivably connecting a sprocket corotatable with a first one of said members and a sprocket corotatable with said shaft, a second driving chain drivably connecting a sprocket corotatable with a second one of said members and a sprocket corotatable with said shaft, and motor means connected to drive said shaft and operable to rotate said spindle assembly as a synchronously corotating unit.

8. Apparatus as claimed in claim 7, including second drive means operable to rotate one of said members relatively of an other thereof.

9. Apparatus as claimed in claim 8, said second drive means comprises a hydraulic motor.

10. Apparatus as claimed in claim 9, including a pair of clutches operable to connect one of said members alternatively to said shaft for corotation with an other of said members and to said second drive means for rotation relatively of said other member.

11. Apparatus as claimed in claim 1, said drive train means including primary and secondary drive train means each operable to rotate at least one pair of said members in synchronous corotation and to rotate one of said pair relatively of the other of said pair of members.

12. Apparatus as claimed in claim 11, a pair of clutches operable in each said drive train means alternatively to connect said members for synchronous rotation and each clutch to connect respectively one of said members for rotation relatively of an other thereof.

13. A tire building drum drive apparatus comprising:
a rotatable spindle assembly for supporting and actuating said drum, the assembly including a plurality of coaxial members each rotatable with and relatively of the other members and each individually drivingly connectable to independently operable parts of said drum,
primary and secondary drive train means each selectably operable to rotate at least one pair of said members in synchronous corotation and one of said pair relatively of the other, and
at least one differential means having first input means connected in positive driving relation with one of said members, second input means connected in positive driving relation with an other of said members, and differential output means rotatable proportionally to the difference in angular displacement between said one and said other of the respectively associated members.

14. Apparatus as claimed in claim 13, said drive train means including brake means and clutch means cooperable to control rotation of two of said members during rotation relative to said two of an other of said members.

15. Apparatus as claimed in claim 13, including displacement means associated with at least one of said differential means to provide a displacement analog of the relative rotation between the respectively associated other and the one of said members.

16. Apparatus as claimed in claim 15, said differential output means comprising a cylindrical shell mounted for rotation about its own cylinder axis, a shaft rotatably fixed in said shell parallel to and spaced radially from said cylinder axis, a pair of gears mounted corotatably on said shaft and spaced axially thereon, said first input means comprising an input gear in driving mesh with one of said pair of gears, said second input means comprising a reversing pinion mounted rotatably on said shell in driving mesh with the other of said pair of gears, and an input gear in driving mesh with said reversing pinion.

17. Apparatus as claimed in claim 16, including positive driving means for providing said positive driving relation comprising a chain and sprocket drive positively drivably connecting each said input means with a respectively associated one of said members for fixed ratio driving relation therebetween.

18. Apparatus as claimed in claim 15, said displacement means comprising a plurality of cam lugs adjustably fixed on said differential shell, a displacement sensor disposed for engagement with each said cam lug at a preselected degree of angular displacement of said differential shell about its own rotation axis.

19. Apparatus as claimed in claim 15, said displacement means comprising a lead screw mounted for rotation about its own longitudinal axis proportionally to rotation of said shell, a non-rotatable nut engaged with said lead screw for linear movement therealong in response to rotation of the lead screw, and means fixed on said nut cooperable with means fixed in space to display an analog of the relative axial positions of axially movable elements of said drum.

20. Apparatus as claimed in claim 19, a manually operable clutch for engaging and disengaging said lead screw and said differential shell respectively in and from driving relationship therebetween.

21. Apparatus as claimed in claim 19, said means fixed on said nut including an indicator and said means fixed in space including a linear scale disposed parallel to said lead screw to cooperate with said indicator to display said analog of the relative axial positions of axially movable elements of said drum.

22. Apparatus as claimed in claim 21, a plurality of displacement sensors adjustably disposed along said screw for detecting movements of said nut to provide actuating signals responsive to selected displacements of said nut.

23. Apparatus as claimed in claim 13, one member of said members being a tubular spindle of circular cross-section mounted for rotation about its own longitudinal axis and having mounting means secured thereon to mount said drum for rotation about said axis, an other member of said members being a quill of circular cross-section mounted coaxially in said spindle for coaxial rotation with and relatively of said spindle and having drive coupling means secured thereon to engage and to drive a part of said drum, and a third member of said members being a center shaft mounted coaxially in said quill for coaxial rotation with and relatively of said quill and said spindle and having drive coupling means secured thereon to engage and to drive another part of said drum.

24. Apparatus as claimed in claim 23, including air flow passage means extending longitudinally of the assembly to connect said drum with means for controlling supply to and exhaust from said drum of compressed air.

25. Apparatus as claimed in claim 13, said first input means of said at least one differential means being connected in positive driving relation with said spindle, said second input means being connected in positive driving relation with said quill, and differential output means rotatable proportionally to the relative angular displacement between the spindle and the quill, and second differential means having first input means connected in positive driving relation with said spindle, second input means connected in positive driving relation with said center shaft, and differential output means rotatable proportionally to the relative angular displacement between the spindle and the center shaft.

26. Apparatus as claimed in claim 25, including displacement means associated with each of said differential means to provide a displacement analog of the relative rotation respectively between the spindle and the quill, and the spindle and the center shaft.

27. Apparatus as claimed in claim 26, said displacement means associated with said quill comprising a plurality of cam lugs adjustably fixed on said differential shell, a displacement sensor disposed for engagement with each said cam lug at a preselected degree of angular displacement of said differential shell about its own rotation axis.

28. Apparatus as claimed in claim 26, said displacement means associated with said center shaft comprising a lead screw mounted for rotation about its own longitudinal axis proportionally to rotation of said shell, a non-rotatable nut engaged with said lead screw for linear movement therealong in response to rotation of the lead screw, and means fixed on said nut cooperable with means fixed in space to display an analog of the relative axial positions of axially movable elements of said drum.

* * * * *